H. AND J. P. GARNER AND W. J. PARKER.
TRACTOR.
APPLICATION FILED MAY 15, 1918.
1,348,558.
Patented Aug. 3, 1920.
6 SHEETS—SHEET 6.
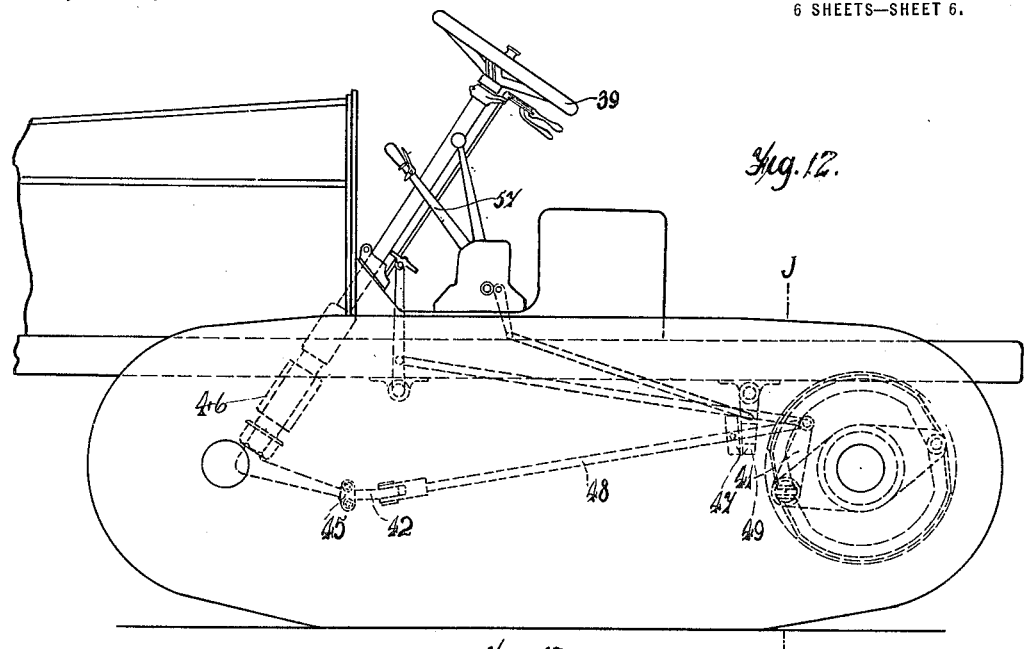
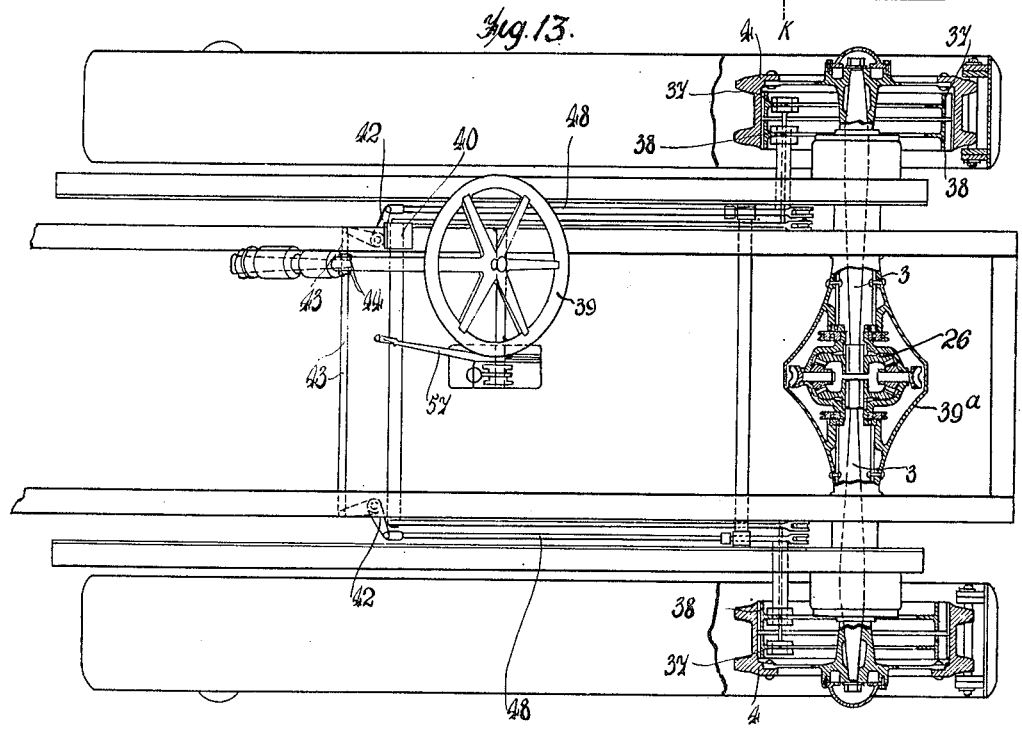

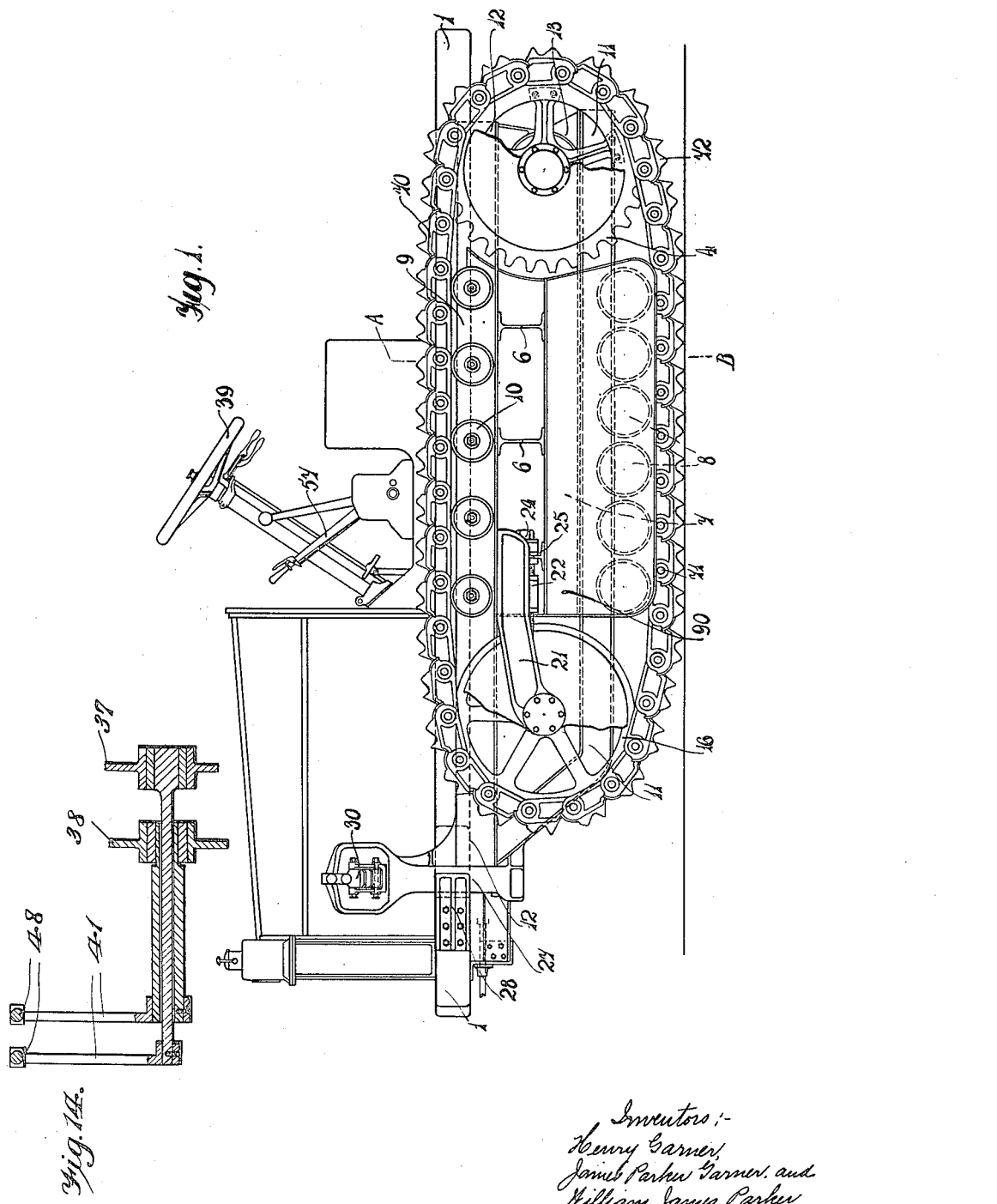

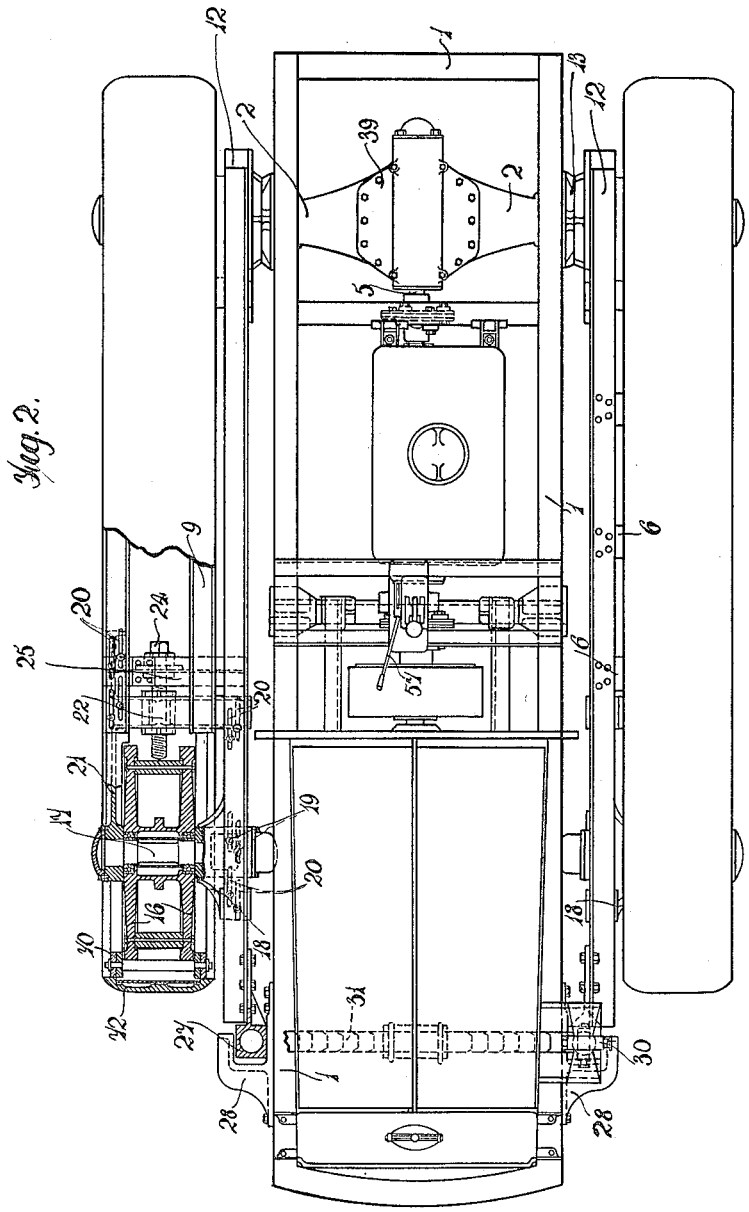

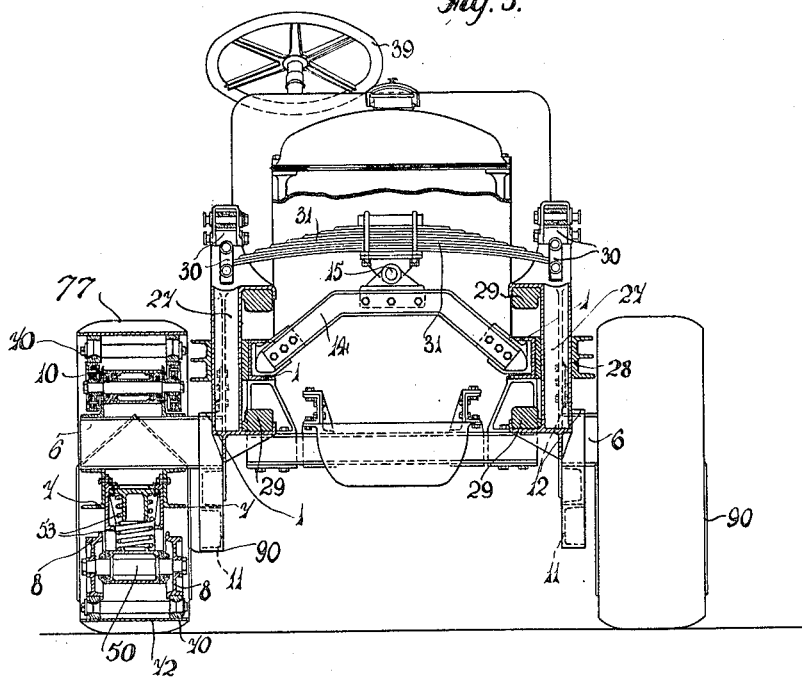
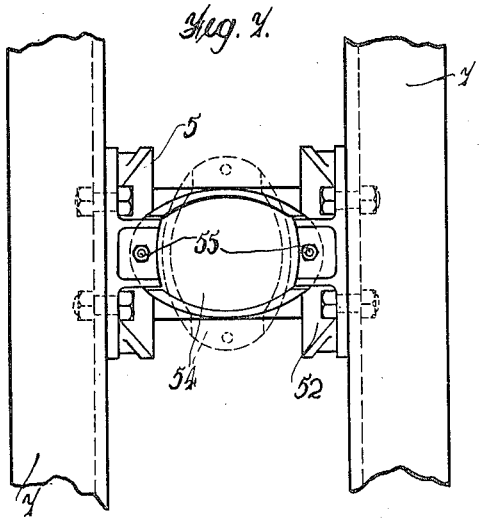
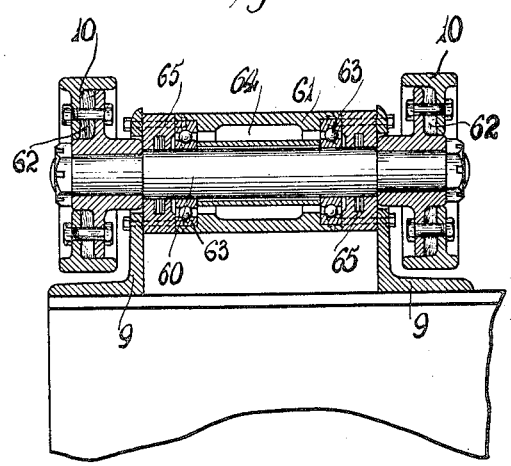

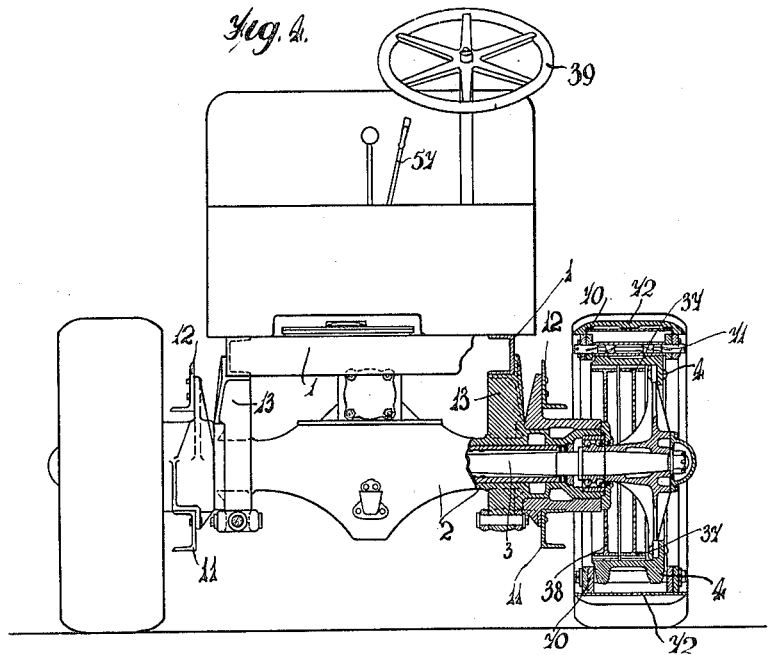
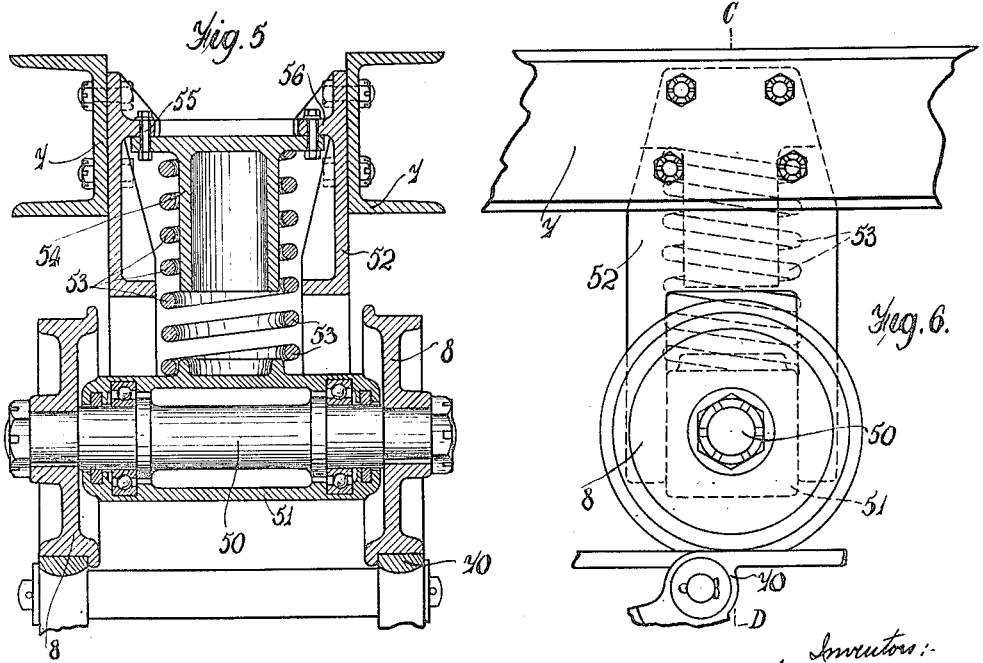

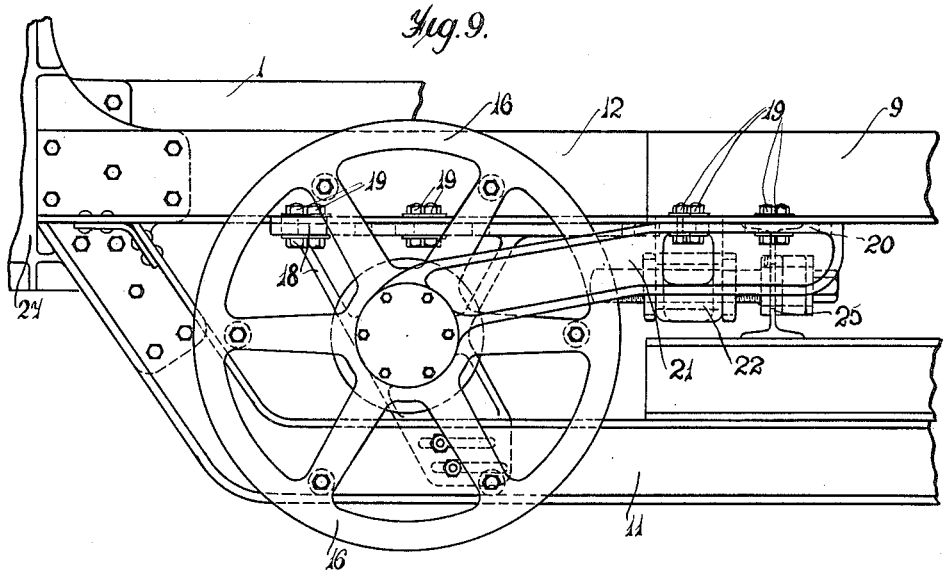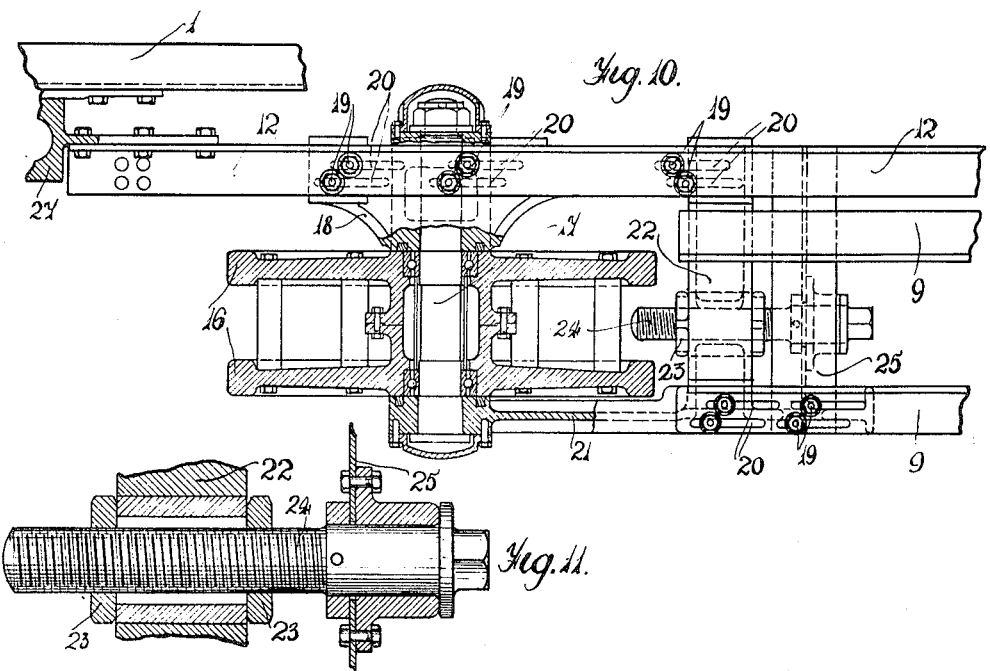

UNITED STATES PATENT OFFICE.

HENRY GARNER, OF MOSELEY, JAMES PARKER GARNER, OF BIRMINGHAM, AND WILLIAM JAMES PARKER, OF MOSELEY, ENGLAND; SAID PARKER ASSIGNOR TO SAID HENRY GARNER AND SAID JAMES PARKER GARNER.

TRACTOR.

1,348,558.     Specification of Letters Patent.     Patented Aug. 3, 1920.

Application filed May 15, 1918. Serial No. 234,766.

*To all whom it may concern:*

Be it known that we, HENRY GARNER, JAMES PARKER GARNER, and WILLIAM JAMES PARKER, subjects of the King of Great Britain, residing at "Avalon", Wake Green Road, Moseley, Birmingham, in the county of Warwick, England; "Croftsholme", Swanshurst Lane, King's Heath, Birmingham, aforesaid, and 124 Alcester road, Moseley, aforesaid, respectively, have invented a new and useful Tractor; and we do hereby declare the following to be a full, clear, and exact description of the same.

Our invention comprises improvements in self-laying endless track vehicles including tractors and transport vehicles, the main object of the present invention being to provide an improved general construction and arrangement of such.

In this type of vehicle it has been the custom to employ two tracks each carried by a track frame pivoted upon the outside of a central chassis frame, and one object of the present invention is to arrange the track frames and connect them to the chassis frame in an improved manner.

Another object is to mount the front track wheels in an improved and detachable manner, while a further object is to provide an improved arrangement of the rear axle.

Another object of the invention is to provide an improved arrangement and control for the steering brakes, while other objects include an improved arrangement of load wheels, an improved mud shield for the track frames, an improved manner of adjustably mounting the jockey pulleys, improved lubrication of the load wheels and jockey pulleys.

Referring to the drawings:—

Figure 1. is a side elevation of a tractor according to this invention, part of the rear wheel being broken away to show the interior.

Fig. 2. is a plan of same with a portion of the one track and front track wheel in section.

Fig. 3. is a front elevation with one of the tracks in section as at A—B in Fig. 1, while the bonnet of the car is broken away and the connections between the track frame and front axle are shown in section.

Fig. 4. is a rear elevation partly in section taken at the rear axle.

Fig. 5. is a vertical section through a pair of the load wheels and its support as at C—D in Fig. 6.

Fig. 6. is a side elevation of same.

Fig. 7. is a plan.

Fig. 8. is a sectional view of a pair of jockey pulleys employed for supporting the upper part of the track.

Fig. 9 is an enlarged elevation showing the front of the track frame and the means whereby the front track wheel may be demounted.

Fig. 10. is a plan of same with the front wheel in section.

Fig. 11. is an enlarged section showing the means whereby the front wheel may be adjusted to compensate for stretch or wear of the track.

Fig. 12. is an elevation of the tractor showing the brake controlling mechanism.

Fig. 13. is a plan of same.

Fig. 14. is a sectional view through the brake controlling mechanism at J—K in Fig. 12.

In carrying this invention into practice as illustrated upon the accompanying drawings, the chassis frame 1, which may be of any suitable construction, is provided with a hollow axle 2 which serves to support the rear portion of the track frames, while through this hollow axle 2 is disposed a solid axle 3 which serves to carry the rear sprocket wheels 4, this solid axle being in two parts and forms the driving axle, the outer axle 2 being also formed in two parts to permit the inner axle 3 to be driven from the shaft 5 by differential gearing 26 as seen in Figs. 12 and 13.

Each track frame consists of a series of short transversely disposed girders 6 beneath which are mounted two longitudinal channel girders 7 which serve to carry the load wheels 8, while above these transverse girders are a pair of longitudinally disposed angle girders 9 which serve to carry the jockey pulleys 10 which support the upper portions of the tracks.

In addition, these transverse girders carry also a third channel girder 11 and a third angle girder 12 of greater length than the other girders, the rear portions of these girders 11, 12 being connected to a bearing 13 at the rear in which the aforementioned axle 2 is supported, while at the front these girders 11, 12 are united together and connected to vertical slides 27 operating in guides 28 carried by a beam 14 secured to the chassis frame.

The forward ends of the track frames through the slides 27 are connected together by the double shackles 30 and the transversely disposed laminated spring 31 which is pivoted to the aforementioned transverse member 14 at 15, this spring 31 acting as a compensating member and also functioning as a spring to resiliently support the front of the chassis, the double shackle compensating for the flexing of the spring, for the angular movement of the spring and also for the angular movement of the track frames relatively to the chassis frame.

By this arrangement as the tractor is passing over uneven laterally inclined ground then the one track may rise higher than the other one, the pivoted equalizing spring serving to evenly distribute the weight between the two tracks even if the one be in a higher plane than the other, and also to absorb ground shocks. Rubber blocks 29 are carried by the slides above and below the members 14 and act as shock absorbers.

The front track carrying wheels 16 are supported by short axles 17 carried by an auxiliary frame 18 which is secured to the underside of the girder 12 by means of pins 19 and slots 20 in such manner that if these pins be slackened the frame 18 together with the front wheel may be adjusted longitudinally to compensate for stretch or wear in the track. On the outside of the wheel the axle 17 is supported by a detachable bracket 21 secured beneath the girder 9 again by pins 19 and slots 20 which permit the adjustment of the bracket 21 at the same time as the part 18 and wheel. This bracket 21 may be entirely removed by detaching the pins 19, 20 and thus enable the wheel 16 and track to be removed when so required. The parts 18 and 21 are connected together by a transverse member 22 which is provided with a nut 23 which is engaged by a screw 24, this screw being rotatably supported in another transverse member 25 which is connected to the girders 9, 11 in such manner that it may rotate but cannot move axially. When the screw 24 is rotated the parts 18, 21 together with the axle 17 and wheel 16 are moved in a direction corresponding with the length of the vehicle for the purpose of taking up slack or wear in the tracks.

The rear wheels 4 are provided with sprocket teeth which engage with the tracks, and inside each of these wheels are a pair of brakes 37, 38, the brakes 37 serving to retard or stop the vehicle being controlled by the pedal 40, while the brakes 38 are for the purpose of steering, these brakes 38 being connected to the steering wheel 39 in such manner that movement of the steering wheel will apply one or other of the brakes so as to retard the movement of the corresponding track, the effect of which is to steer the vehicle, this being accomplished under the control of a steering wheel which makes its control approximate to that of an ordinary vehicle. As previously stated the axle 3 is made in two parts, these two parts being driven through differential gearing 26 contained in the differential box 39ª and functioning in well known manner.

The brakes 38 are controlled by crank arms 41, rods 48, bell crank levers 42, and sliding rods 43 which carry abutments 44 and pass through holes in a crank arm 45 which is connected to the steering wheel 39 through the medium of a reducing gear 46 so that when the steering wheel is moved in the one direction the one abutment 44 will be engaged by the crank arm 45 and the corresponding brake applied, the arm 45 meanwhile sliding freely along the other rod 43.

Means are provided for enabling the steering brakes to be used for retarding purposes comprising an abutment 47 upon each of the rods 48, these abutments being adapted to be engaged by the part 49 controlled by the hand lever 57 the movement of which will apply the two brakes irrespective of the steering wheel.

As is customary in this class of vehicle, the weight is borne not by the main wheels but by the load wheels 8 so as to give a maximum surface contact between the tracks and the road. These load wheels 8 are arranged in pairs and each pair carried by a spindle 50 supported in an axle box 51 which is slidably supported in a bracket 52 secured between the girders 7, 7. Between the axle box 51 and the bracket 52 is disposed a helical load spring 53 the upper part of which bears against the underside of a member 54 which is bolted to the bracket 52 by bolts 55. To enable this spring to be secured in position the bracket 52 has projecting lugs 56, while the upper portion of the member 54 is of elliptical shape so that when in the position shown by the dotted lines in Fig. 7 it can be pressed downwardly into place compressing the spring 53, after which it is moved angularly through 90 degrees to the position shown by the full lines in Fig. 7 when it will be beneath the lugs 56 where it can be secured by the bolts 55.

The jockey pulleys 10 are also in pairs carried by spindles 60 which are rotatably supported in bearings 61 connected to the girders 9, these jockey pulleys 10 being formed in two parts with a wood or other disk 62 clamped between them for the purpose of deadening the sound which would otherwise arise from the tracks passing over the jockey pulleys. As shown, the spindles are supported by ball bearings 63, an annular space 64 being provided in which lubricant may be placed for the purpose of effectively lubricating the bearings, while felt washers may be disposed at 65 to prevent the escape of the lubricant.

The tracks which are constructed according to our concurrent application Serial No. 285,090, consist of two pairs of rail sections 70, connected together by pintles 71, which carry beneath them a track shoe 72, having transverse gripping ribs 77.

To protect the lower portion of the track from mud dropping from the upper part, i. e. the part passing over the jockey pulleys, a shield 90 is provided which extends over the girders, and is inclined at the top and provided with depending sides which are so arranged as to cause falling mud to drop on either side of the lower part of the track instead of onto its interior upper surface as it would otherwise do.

What we claim then is:—

1. In a tractor the combination of a chassis frame; a pair of track frames pivoted to said chassis frame; a transversely disposed spring member pivoted to the chassis frame and having its extremities connected to the track frames; a pair of guides carried by said chassis frame; and a vertically disposed slide carried by each of said track frames operating in said guides and being connected to said transverse spring member; for the purpose specified.

2. In a tractor a track carrying frame having in combination a chassis frame; a rear wheel driving axle carried by said chassis frame; a plurality of transversely disposed members; a pair of longitudinally disposed members carried beneath said transverse members and carrying load wheels; a pair of longitudinally disposed members carried above said transverse members and carrying jockey pulleys; a third longitudinaly disposed member carried beneath said transversely disposed members; a third longitudinally disposed member carried above said transversely disposed members; and a bearing member around said axle and carried by said third upper and lower longitudinal members.

3. In a tractor a track carrying frame having in combination a plurality of transversely disposed members; a pair of longitudinally disposed members carried beneath said transverse members and carrying load wheels; a pair of longitudinally disposed members carried above said transverse members and carrying jockey pulleys; a rear driving sprocket; a forward idler wheel; an endless track disposed around said rear driving sprocket, idler wheel, load wheels and jockey pulleys, and a member detachably secured to one of said upper longitudinal members supporting said idler wheel, the removal of this member permitting said idler wheel to be demounted.

4. In a tractor a track carrying frame having in combination a plurality of transversely disposed members; a pair of longitudinally disposed members carried beneath said transverse members and carrying load wheels; a pair of longitudinally disposed members carried above said transverse members and carrying jockey pulleys; and a mud shield disposed above and at the sides of said lower pair of longitudinally disposed members, and projecting downwardly beyond the load wheels the sides of which are thereby completely covered, for the purpose specified.

5. In a tractor the combination of a chassis frame; a track carrying frame pivoted to said chassis frame; an axle box carrying member mounted beneath said track carrying frame and having inwardly projecting lugs; an axle box slidably supported in said carrying member; an abutment member having a non-circular flange secured beneath said lugs but having one diameter less than the distance between said lugs; a helical spring between said axle box and said abutment member; and a pair of load wheels carried by said axle box.

6. In a tractor the combination of a chassis frame; a pair of track frames one on each side of said chassis frame; a track carried by each of said track carrying frames; a pair of driving sprockets one for each track; a differential gear controlling said sprockets; a brake operable upon each sprocket; a steering wheel; means connecting said steering wheel and brakes in such manner that movement of the wheel in one direction will apply one brake while reverse movement will apply the other brake; and means for simultaneously applying both of said steering brakes for the purpose of retarding the movement of the tractor.

7. In a tractor the combination of a chassis frame; a pair of track frames one on each side of said chassis frame; a track carried by each of said track carrying frames; a pair of driving sprockets one for each track; a differential gear controlling said sprockets; an internal band brake disposed within each of said sprockets; a steering wheel; means connecting said steering wheel and brakes in such manner that movement of the wheel in one direction will apply one brake while reverse movement will apply the other brake; and means for simultaneously applying both of said steering brakes for the purpose of retarding the movement of the tractor.

8. In a tractor the combination of a chassis frame; a pair of track frames one on each side of said chassis frame; a track carried by each of said track carrying frames; a pair of driving sprockets one for each track; a differential gear controlling said sprockets; an internal band brake disposed within each of said sprockets; a steering wheel having a crank arm connected to it; rods connected to said brakes and having a pair of abutments one of which is engaged by said crank arm when it moves in one direction while the other abutment is engaged on the reverse movement; and means for simultaneously applying both of said steering brakes for the purpose of retarding the movement of the tractor.

In testimony whereof we affix our signatures in presence of two witnesses.

HENRY GARNER.
JAMES PARKER GARNER.
WILLIAM JAMES PARKER.

Witnesses:
WILLIAM GREATWOOD,
A. H. BILLING.